United States Patent [19]

Shibata

[11] 4,429,010
[45] Jan. 31, 1984

[54] HIGH DENSITY MAGNETIC RECORDING MEDIUM

[75] Inventor: Fujio Shibata, Tokyo, Japan

[73] Assignee: TDK Electronics Co., Ltd., Tokyo, Japan

[21] Appl. No.: 361,244

[22] Filed: Mar. 24, 1982

[30] Foreign Application Priority Data

Apr. 27, 1981 [JP] Japan .................................. 56-62556

[51] Int. Cl.³ .............................................. G11B 5/68
[52] U.S. Cl. .............................. 428/425.9; 252/62.54; 360/134; 360/135; 360/136; 427/128; 428/463; 428/692; 428/694; 428/900
[58] Field of Search .............. 428/694, 695, 900, 692, 428/425.9, 463; 360/134–136; 252/62.54; 427/128

[56] References Cited

U.S. PATENT DOCUMENTS

| 4,275,115 | 6/1981 | Naruse | 428/900 |
| 4,340,644 | 7/1982 | Ota | 428/900 |
| 4,352,859 | 10/1982 | Yoda | 428/900 |

*Primary Examiner*—Ellis P. Robinson
*Attorney, Agent, or Firm*—Oblon, Fisher, Spivak, McClelland & Maier

[57] ABSTRACT

A magnetic recording medium obtained by kneading ferromagnetic particles with a binder composition and coating on a non-magnetic substrate, which is characterized by that the binder composition comprises a copolymer comprising 80–89% of vinyl chloride, 5–10% of vinyl acetate and 6–10% of vinyl alcohol and a polyurethane elastomer.

3 Claims, No Drawings

HIGH DENSITY MAGNETIC RECORDING MEDIUM

BACKGROUND OF THE INVENTION

1. FIELD OF THE INVENTION

The present invention relates to a high density magnetic recording medium.

2. DESCRIPTION OF THE PRIOR ART

At present, as magnetic recording media, those obtained by kneading ferromagnetic particles with a binder vehicle and coating on a non-magnetic substrate are generally employed. However, with the expansion of uses of magnetic recording, even further higher density is required.

As the characteristics which make high density recording possible, the following are contemplated:

(1) the coercive force of the ferromagnetic particles is high;

(2) The Is (saturation magnetization intensity) of the ferromagnetic particles is high;

(3) The particle size of the ferromagnetic particles is small;

(4) The ferromagnetic particles are uniformly dispersed in the binder vehicle;

(5) The magnetic coat is smooth and there is no spacing loss; and so forth.

In respect to the requirements (1), (2), and (3), the production of ultrafine particles has been made possible by the improvement of needle-shaped iron oxides, or the advent of cobalt-adsorbed needle-shaped iron oxides and recent needle-shaped metallic iron, or the innovation of production techniques of ferromagnetic particles.

The method for dispersing ferromagnetic particles in a binder vehicle requires the use of a highly efficient dispersing machine, and the improvement of the binder plays an important role. However, with respect to such ultrafine particles, satisfactory levels of dispersion have not yet been achieved.

The most common composition of a binder vehicle used for a magnetic recording medium is a mixture of a vinyl chloride-vinyl acetate-vinyl alcohol copolymer and a polyurethane elastomer or a butadiene-acrylonitrile copolymer. Examples of the vinyl chloride-vinyl acetate-vinyl alcohol copolymer include VAGH produced by Union Carbide Co., S-lec A produced by Sekisui Chemical Co., Vinylite #1000G produced by Electro Chemical Industy Co., etc., and the proportion of the vinyl chloride, vinyl acetate and vinyl alcohol is approximately 91:3:6.

However, such a copolymer has been inadequate with respect to dispersibility, the surface gloss on surface calender processing, and the adhesion to a substrate.

In order to solve these problems, it has now been discovered that a magnetic coat having excellent properties may be obtained by changing the compositional ratio of the vinyl chloride-vinyl acetate-vinyl alcohol copolymer. That is, it has now been discovered that by changing the contents of vinyl acetate and vinyl alcohol in the copolymer, the dispersibility or the surface gloss on calender processing, and the adhesion to a substrate can be improved.

SUMMARY OF THE INVENTION

Accordingly, the present invention provides a magnetic recording medium obtained by kneading ferromagnetic particles with a binder composition and coating the same on a non-magnetic substrate, wherein the binder composition comprises a copolymer comprising 80-89% of vinyl chloride, 5-10% of vinyl acetate and 6-10% of vinyl alcohol by weight percent and a polyurethane elastomer.

The present invention further provides a binder which can disperse the above-described ultrafine particles uniformly therein and can provide sufficient characteristics as a magnetic recording medium.

DETAILED DESCRIPTION OF THE PREFERRED EMBODIMENTS

Where the content of vinyl alcohol is increased, the dispersibility is improved although the surface gloss on calender processing is lessened.

On the other hand, where vinyl acetate is increased, the surface gloss and the adhesion to a substrate are both enhanced, but the dispersibility of ferromagnetic particles in a binder is reduced.

Based on such facts, by employing a copolymer wherein the amounts of vinyl chloride, vinyl acetate and vinyl alcohol fall into the ranges of 80-89%, 5-10% and 6-10% respectively, a magnetic recording medium having excellent dispersibility, calender processability and adhesion to a substrate has been thus obtained.

More particularly, an example of such a copolymer is Vinylite #1000GSK produced by Electro Chemical Industy Co.

Examples of the ferromagnetic particles which are excellent in high density recording include alloy magnetic particles based on needle-shaped iron, but since their surface is complicated and their saturation magnetization intensity is twice or more as great as that of the conventional iron oxide based particles, it is even further difficult to disperse them in a binder vehicle.

However, by employing a copolymer, as favorably represented by Vinylite #1000GSK used in the present invention, as a binder, the above problems can be eliminated, thereby a magnetic recording medium which can bring out the characteristics inherent to the alloy magnetic particles may be obtained.

Further, it is also possible to improve physical properties of the magnetic recording medium, for example, to prevent the falling-off of the ferromagnetic particles on continuous running, or squeaking between the magnetic head and the recording medium on high-temperature high-humidity running, by adding 5-30% (calculated as the solids based on the binder) of a polyisocyanate compound, such as Desmodur L (produced by Bayer AG), Colonate L (Nippon Polyurethane), Colonate HL (Nippon Polyurethane), Colonate 2031 (Nippon Polyurethane) etc. and heat curing it in a predetermined manner.

Where the amount added is 5% or less, the effect of the addition is not manifested, whereas the addition of more than 30% brings about such disadvantages as reduction in adhesion to a substrate, or reduction in electromagnetic transducing characteristics.

The present invention will be further illustrated by certain examples and references which are provided for illustration only and are not intended to limit the present invention.

EXAMPLE 1

Needle-shaped metallic powder (average minor axis diameter of 0.04 $\mu$m): 400 parts Dispersing agent (Lecithin): 12 parts
Vinyl chloride-vinyl acetate-vinyl alcohol copolymer (Vinylite #1000GSK by Electro Chemical Industry) (85% vinyl chloride, 7% vinyl acetate and 8% vinyl alcohol): 60 parts
Polyurethane resin (Nippolan #2304): 114 parts
Methyl ethyl ketone: 600 parts
Methyl isobutyl ketone: 300 parts The above components were mixed together in a high speed stirrer, then thoroughly kneaded and dispersed in a sand grinder mill. Further, 20 parts of a polyisocyanate (Colonate L produced by Nippon Polyurethane Co.) was added and mixed by stirring to obtain a magnetic paint.

This paint was coated on a polyethyleneterephthalate film of 12 μm in thickness to a coat thickness of about 4 μm and, after subjecting it to surface processing, it was cured at 60° C. for 24 hours. The thus obtained magnetic recording medium was measured in a magnetic field of 5000 θe using a vibrating type magnetism meter, to reveal a coercive force of 1130 Oersted, a maximum residual magnetic flux density of 3800 Gauss, and a rectangular ratio of 0.85. Further, this recording medium was measured using a gloss meter (GM-3D) at an incident angle of 60°, to obtain +7.5 dB against the standard panel.

In addition, this recording medium was cut into 3.81 mm each in width and the dynamic peeling strength was measured to obtain 21 g.

The high dispersibility of the ferromagnetic particles are represented by the maximum residual magnetic flux density, the rectangular ratiom and the gloss value of the surface. And, as regards the surface gloss on calender processing, it can be said that the greater the numerical value of the surface gloss as measured on a gloss meter, the more excellent the high density recording medium is.

EXAMPLES 2, 3 and 4

Using the compositions ratios set forth in the table below instead of the composition ratio of the vinyl chloride-vinyl acetate-vinyl alcohol copolymer used in Example 1, magnetic recording media were obtained similarly. The various characteristics are shown in the table.

Further, a conventionally employed magnetic recording medium obtained from a copolymer comprising 91% of vinyl chloride, 3% of vinyl acetate and 6% of vinyl alcohol is also given as Comparative Example 1 in the table.

As can be seen from the table, where the content of vinyl acetate in the vinyl chloride-vinyl acetate-vinyl alcohol copolymer is less than 5%, the dynamic peeling strength and the gloss value are drastically decreased. On the other hand, where the content of vinyl alcohol is decreased to less than 6%, the rectangular ratio becomes 0.81-0.82 or less, showing that sufficient dispersion is not obtained. In addition, experiments were carried out on a number of compositional ratios other than those in the examples, and it was confirmed that the most favorable results were obtained when the composition was 80-85% of vinyl chloride, 5-10% of vinyl acetate and 6-10% of vinyl alcohol (100% in total).

The present invention, as described above, illustrates a combination of a copolymer of vinyl chloride-vinyl acetate-vinyl alcohol copolymer and a polyurethane resin, and this tendency is also obtained when the kind and amount of the polyurethane resin are changed, and therefore such variations are also included within the scope of the present invention. The polyisocyanate is added after the rest of the components of the magnetic paint have been mixed and dispersed; the amount of the polyisocyanate compound to be added is preferably 10-25%, in which case, the physical properties are most enhanced. With the addition of less than 5%, the effect of the addition is hardly manifested, while the addition of more than 30% deteriorates characteristics such as dynamic peeling strength.

The above results fall within the scope of the present invention and satisfy the requirements for a high density magnetic recording medium.

I claim:

1. A magnetic recording medium comprising a coating of ferromagnetic particles and a binder on a nonmagnetic substrate; wherein said binder consists of a copolymer and a polyurethane elastomer, wherein said copolymer consists of 80-89% of vinyl chloride, 5-10% of vinyl acetate and 6-10% of vinyl alcohol, by weight.

2. The magnetic recording medium according to claim 1 wherein the ferromagnetic particles are needle-shaped and iron-based alloy magnetic particles.

3. A magnetic recording medium comprising a coating of ferromagnetic particles and a binder on a nonmagnetic substrate; wherein said binder consists of a copolymer, a polyurethane elastomer, and a polyisocyanate compound;
wherein said copolymer consists of 80-89% of vinyl chloride, 5-10% of vinyl acetate and 6-10% of vinyl alcohol, by weight; and wherein said polyisocyanate compound comprises of 5-30% by weight of said binder.

* * * * *

|  | Vinyl Chloride (%) | Vinyl Acetate (%) | Vinyl Alcohol (%) | Coercive Force (θe) | Maximum Residual Magnetic Flux Density (G) | Rectangular Ratio | Dynamic Peeling Strength (g) | Gloss Value (dB) |
|---|---|---|---|---|---|---|---|---|
| Example 2 | 84 | 10 | 6 | 1130 | 3700 | 0.82 | 29 | +8.0 |
| 3 | 85 | 5 | 10 | 1130 | 3800 | 0.85 | 19 | +6.5 |
| 4 | 89 | 5 | 6 | 1140 | 3600 | 0.81 | 18 | +7.1 |
| Comparative Example 1 | 91 (Vinylite VAGH) | 3 | 6 | 1140 | 3600 | 0.80 | 16 | +5.5 |